(12) United States Patent
Smidt et al.

(10) Patent No.: US 9,970,685 B2
(45) Date of Patent: May 15, 2018

(54) DEVICE AND METHOD FOR FIXING OBJECTS, IN PARTICULAR SOLAR PANELS, TO A ROOF

(71) Applicant: ESDEC B.V., Deventer (NL)

(72) Inventors: Theo Jacob Smidt, Harfsen (NL); Jeroen de Vogel, Gorssel (NL)

(73) Assignee: ESDEC B.V., Deventer (NL)

( * ) Notice: Subject to any disclaimer, the term of this patent is extended or adjusted under 35 U.S.C. 154(b) by 0 days. days.

(21) Appl. No.: 15/230,619

(22) Filed: Aug. 8, 2016

(65) Prior Publication Data

US 2016/0341238 A1   Nov. 24, 2016

Related U.S. Application Data

(63) Continuation of application No. 11/816,963, filed as application No. PCT/NL2006/050031 on Feb. 22, 2006, now Pat. No. 9,435,568.

(30) Foreign Application Priority Data

Feb. 23, 2005 (NL) ..................................... 1028379

(51) Int. Cl.
*F24J 2/52* (2006.01)
*H02S 20/23* (2014.01)
*F24J 2/46* (2006.01)

(52) U.S. Cl.
CPC .......... *F24J 2/5247* (2013.01); *F24J 2/5205* (2013.01); *H02S 20/23* (2014.12); *F24J 2002/4661* (2013.01); *F24J 2002/4665* (2013.01); *Y02B 10/12* (2013.01); *Y02B 10/20* (2013.01); *Y02E 10/47* (2013.01)

(58) Field of Classification Search
CPC ........ F24J 2/5243; F24J 2/5245; F24J 2/5247; F24J 2002/4665; F24J 2002/4661; F16B 7/0473; F16B 7/22; F16B 45/00
See application file for complete search history.

(56) References Cited

U.S. PATENT DOCUMENTS

| 4,775,570 | A | 10/1988 | Ohlenforst et al. |
| 6,370,828 | B1 * | 4/2002 | Genschorek .......... F24J 2/5205 52/173.3 |
| 6,405,494 | B1 | 6/2002 | Wismeth |
| 6,465,724 | B1 | 10/2002 | Garvison et al. |
| 6,959,517 | B2 * | 11/2005 | Poddany ............... E06B 1/6015 52/173.3 |

(Continued)

FOREIGN PATENT DOCUMENTS

| DE | 19717996 A1 | 10/1998 |
| DE | 29817311 U1 | 12/1998 |

(Continued)

OTHER PUBLICATIONS

Examination Report dated Dec. 21, 2015, 5 pages, from European Patent Application No. 06/716,665.

(Continued)

*Primary Examiner* — Andrew J Triggs
(74) *Attorney, Agent, or Firm* — Maier & Maier, PLLC

(57) ABSTRACT

The invention relates to a device for fixing objects, in particular solar panels, to a roof. The invention also relates to an assembly of such devices. The invention further relates to a method for fixing objects, in particular solar panels, to a roof.

6 Claims, 3 Drawing Sheets

(56) References Cited

U.S. PATENT DOCUMENTS

Figure 1A:
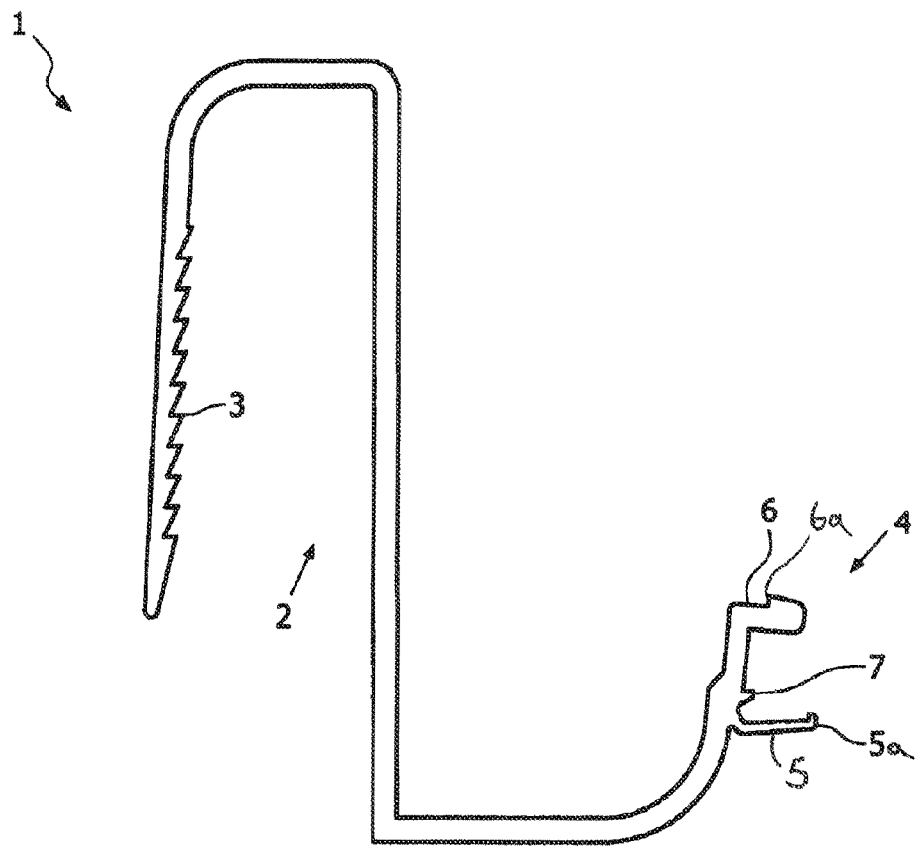

| | | | |
|---|---|---|---|
| 8,039,733 B2 * | 10/2011 | Kobayashi | F24J 2/5211 136/243 |
| 8,109,048 B2 | 2/2012 | West et al. | |
| 9,435,568 B2 * | 9/2016 | Smidt | F24J 2/5205 |
| 2004/0154655 A1 | 8/2004 | Tanaka | |
| 2004/0187909 A1 | 9/2004 | Sato et al. | |
| 2004/0221524 A1 * | 11/2004 | Poddany | E06B 1/6015 52/204.5 |
| 2009/0025313 A1 * | 1/2009 | Smidt | F24J 2/5205 52/173.3 |
| 2009/0044850 A1 | 2/2009 | Kimberley | |
| 2016/0341238 A1 * | 11/2016 | Smidt | F24J 2/5205 |

FOREIGN PATENT DOCUMENTS

| | | | |
|---|---|---|---|
| DE | 19811399 A1 * | 9/1999 | F24J 2/5211 |
| DE | 19811399 A1 | 9/1999 | |
| DE | 29912699 U1 | 1/2000 | |
| DE | 10132557 A1 | 6/2002 | |
| DE | 20307139 U1 | 7/2003 | |
| DE | 10344202 A1 | 4/2004 | |
| DE | 202004008499 U1 | 10/2004 | |
| EP | 1348915 A2 | 10/2003 | |
| FR | 2540921 A1 | 8/1984 | |
| WO | 9917063 A1 | 4/1999 | |

OTHER PUBLICATIONS

Search Report for Netherlands Patent Application No. 1028379; dated Sep. 19, 2005.

Search Report for International Patent Application No. PCT/NL2006/050031; dated Dec. 29, 2006.

* cited by examiner

DEVICE AND METHOD FOR FIXING OBJECTS, IN PARTICULAR SOLAR PANELS, TO A ROOF

The invention relates to a device for fixing objects, in particular solar panels, to a roof. The invention also relates to an assembly of such devices. The invention further relates to a method for fixing objects, in particular solar panels, to a roof.

Solar panels and solar boilers are increasingly being arranged commercially on roofs, which may or may not be pitched, in order to be able to employ solar energy in relatively simple and advantageous manner for generating electricity or for heating a medium. Such objects are fixed to a roof by means of a fixing device or supporting device. The known fixing device herein comprises a plurality of profiles which are fixed by means of screws to one or more tile battens, and a mounting rail which is fixed to the profiles by means of—usually specifically designed—mechanical fixing elements such as for instance bolts, nuts and so on. The actual object can herein be arranged on the mounting rail. The known fixing device does however have a number of drawbacks. A significant drawback of the known device is that the mounting of an object on the roof is a relatively time-consuming activity, because of the relatively high number of mechanical fixing elements required. Special tools are moreover often required, such as for instance a right-angle screwing machine, for mounting the device correctly. In addition, mounting of the device can usually only be carried out by specialist professionals, which generally makes mounting of the object relatively expensive.

The invention has for its object to provide an improved device of the type stated in the preamble which can be fixed relatively simply and quickly to a roof.

The invention provides for this purpose a device of the type stated in the preamble, comprising: at least one base element connectable to the roof, and a top structure connectable to the base element for fixing to an object, wherein the base element and the top structure can be mutually coupled by means of a snap connection. By mutually coupling the base element and the top structure by means of a snap connection, often also referred to as a click connection, the number of components required for mounting the device according to the invention can be significantly reduced, which considerably facilitates and, in particular, simplifies and speeds up mounting. Furthermore, specialist professionals are not required for the purpose of realizing the coupling between the base element and the top structure. Nor are specific tools necessary to enable realizing of the snap coupling. Tests have shown that with the relatively rapid and simplified mounting of the device according to the invention a cost-saving of about 40% can be achieved compared to the average cost of mounting a conventional device known from the prior art; and the time required for mounting the device according to the invention is generally reduced by about 60% compared to the time required for mounting the conventional device. This reduced mounting time, and therefore working time, is generally also advantageous from a working safety viewpoint, since a fitter need only be on usually dangerous pitched roofs for a relatively short period of time. The device will generally be applied for mounting solar panels on a tiled roof. It is however also possible to envisage arranging other objects, such as for instance a solar boiler, on the roof by means of the device according to the invention. In addition to fixing such objects to a roof, it is also possible to envisage fixing such objects by means of a device according to the invention to for instance an (outside) wall of a property. In order to realize the snap connection the base element preferably comprises coupling means for co-action with mating means forming part of the top structure. Both the coupling means and the mating means can herein be of very diverse design. The coupling means and the mating means are however preferably adapted to mutually realize a relatively strong, stable and reliable snap connection, so as to be able to prevent, or at least counter, undesired uncoupling of the object relative to the roof.

In a preferred embodiment of the device according to the invention the base element and the top structure are adapted for mutually releasable coupling. It is then made possible to disassemble an already mounted device in relatively simple manner. A releasable coupling moreover facilitates maintenance and or replacement operations on parts of the device. The snap connection is preferably adapted for two-dimensional fixation of the relative orientation of the base element and the top structure. One dimension is herein not fixed and therefore left free, whereby the relative orientation between the base element and the top structure can be changed in one-dimensional (linear) manner, wherein the base element is for instance linearly slidable along the top structure and vice versa. Such a fixation is usually advantageous since alignment of the base element relative to the roof can be realized relatively simply in this manner.

In a preferred embodiment the base element is provided with a substantially hook-shaped member adapted for co-action with a part of the roof, in particular with a tile batten arranged on the roof. In this manner at least a part of the base element can be enclosed relatively efficiently between tiles on a tiled roof without additional mechanical fixing means being necessary here. A strong and reliable coupling can be realized between the roof and the base element merely by hooking the base element, or at least the hook-shaped member thereof, behind a tile batten or any other suitable element forming part of the roof. This preferred embodiment of the base element can therefore not only be mounted relatively quickly and simply, but also has the advantage that the tile batten is not damaged, whereby the tile batten is not (any longer) unnecessarily weakened. In conventional systems the base element is fixed to the tile batten by means of mechanical fixing elements, such as screws, often resulting in splitting and/or cracking of the tile batten, whereby the tile batten and therefore the mutual coupling between the base element and the tile batten may be considerably weakened. In a particular preferred embodiment the hook-shaped member is provided with at least one at least partially profiled side. The friction between the roof and the base element can be increased by the profiled side, which generally increases the strength of the coupling between the roof and the base element. The profile is preferably formed by a sawtooth profile adapted for relatively intensive co-action with a part of the roof, in particular a tile batten. Since the dimensioning, and in particular the thickness, of the tile battens is not standardized, a wide range of tile battens is available on the market. In order to nevertheless allow the base element, in particular the hook-shaped member, to coact in relatively reliable manner with the tile batten irrespective of the thickness thereof, the volume of a receiving space enclosed by the substantially hook-shaped member can preferably be changed. In this way the hook-shaped member acquires a certain adaptive capacity, wherein the effective dimensioning of the hook-shaped member can be geared to the tile batten in question.

The top structure can be very diverse in nature, but is preferably formed by a mounting rail to which the object, in particular the solar panel, can be fixed. The advantage of a mounting rail is that the relative orientation between the mounting rail and the object can be changed—in general linearly—to thus allow the object to be positioned and aligned in ideal manner. The device preferably comprises a plurality of base elements, which base elements are adapted for simultaneous co-action with the top structure. The mutual distance of the base elements can vary here, but is for instance about one meter.

In a preferred embodiment the base element is formed by an extrusion profile. The extrusion profile will usually be formed first of all here, whereafter the extrusion profile is divided, for instance by means of sawing, into a plurality of parts forming a corresponding number of base elements. Forming the base element from an extrusion profile (or at least a part thereof) has the important advantage that in this way a relatively strong base element can be provided compared to base elements manufactured by means of casting, injection moulding and folding, which increases the strength of the device.

The invention also relates to an assembly of a plurality of devices according to the invention, wherein the assembly is adapted to support at least one object, in particular a solar panel. The relative orientation of the components of the assembly can herein be very diverse in nature. However, the top structures of the devices preferably have a substantially parallel orientation relative to each other. The distance between the top structures can however vary here, although the mutual distance between the top structures is preferably such that about four base elements can be arranged per m², in order to be able to achieve a stable and durable support of an object, in particular a solar panel, of average size.

The invention further relates to a method for fixing objects, in particular solar panels, to a roof, preferably by means of the device according to the invention, comprising the steps of: A) fixing at least one base element to a roof, in particular to a tile batten arranged on the roof, B) fixing a top structure to the base element by means of a snap connection, and C) fixing at least one object to the top structure. Because, due to forming of the snap connection, additional mechanical fixing elements are not required for mounting the device, and thereby the object, on the roof, the object can be arranged relatively quickly and efficiently on the roof. During step A) a plurality of base elements will usually be arranged, and during step B) a plurality of top structures will be coupled to the base elements, in order to allow a reliable support structure to be generated for the object or the plurality of objects. Further advantages and preferred embodiments of the method according to the invention have already been described comprehensively in the foregoing.

Figure 1B:
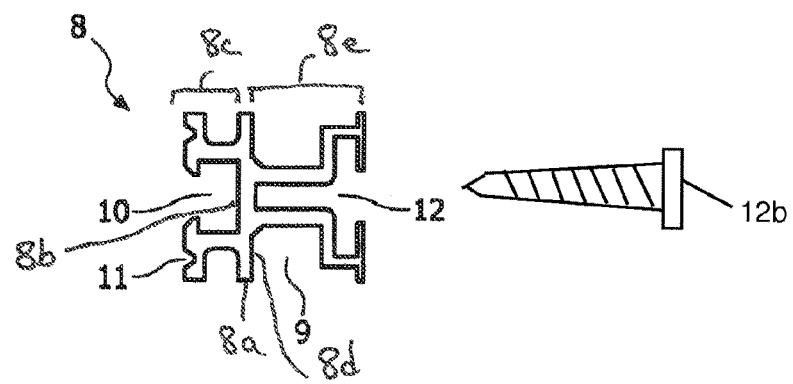
Figure 2:
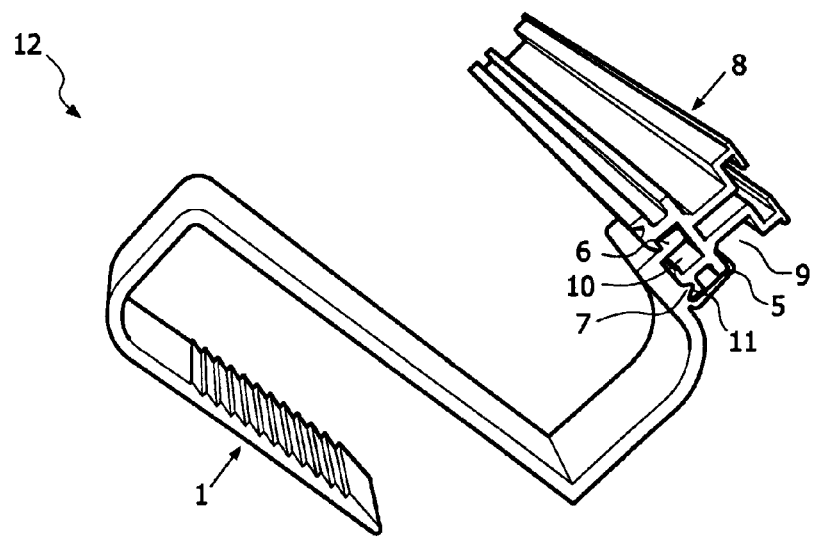
Figure 3:
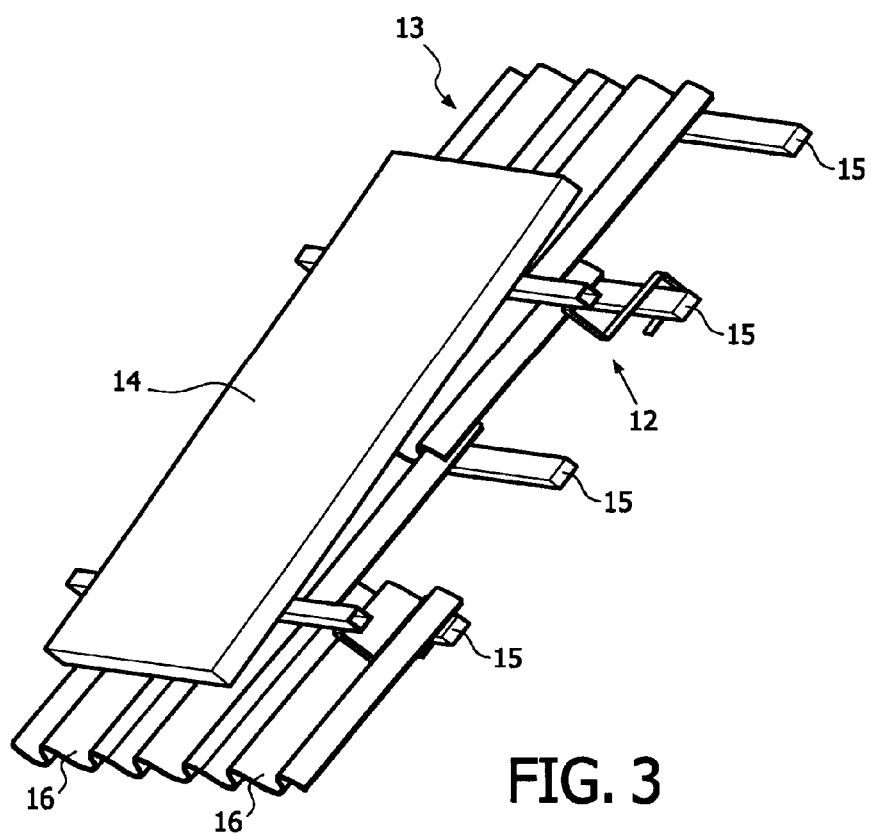
Figure 4:
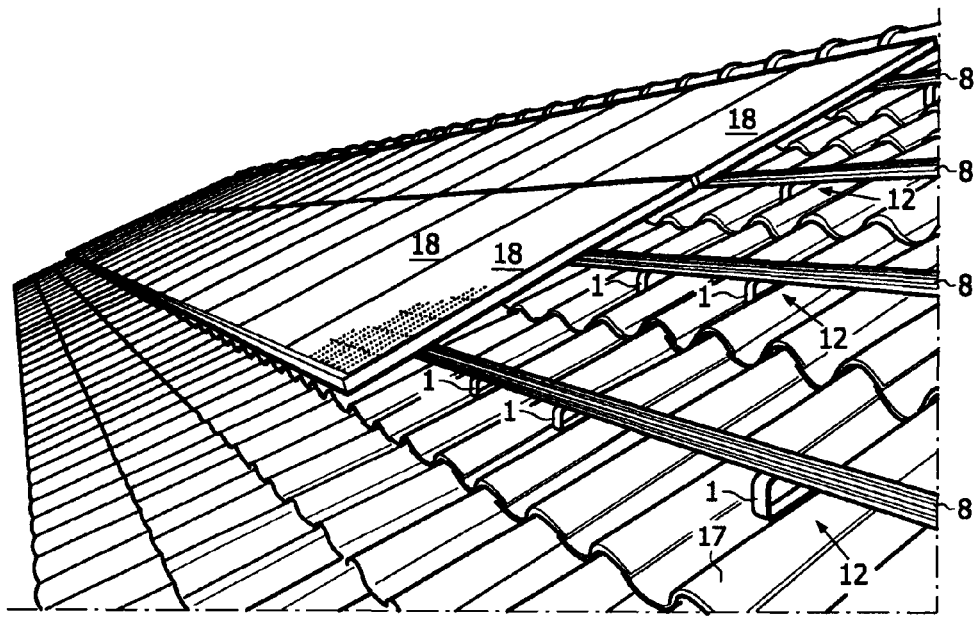
Figure 5:
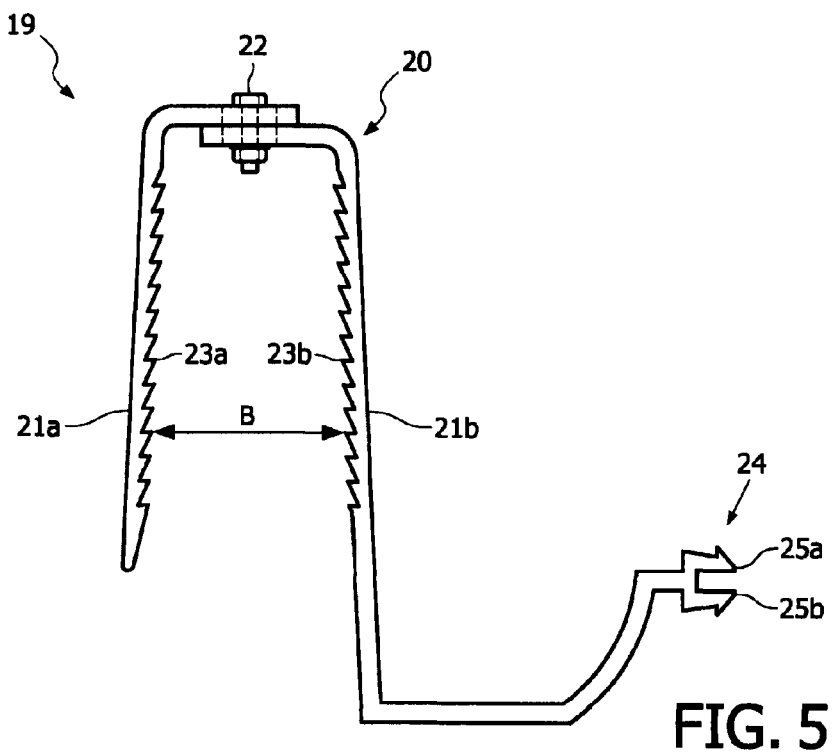

The invention will be elucidated with reference to non-limitative exemplary embodiments shown in the following figures. Herein:

FIG. 1a shows a side view of a roof hook of a device according to the invention, FIG. 1b shows a side view of a mounting rail of a device according to the invention, FIG. 2 is a perspective view of the roof hook according to FIG. 1a and the mounting rail according to FIG. 1b co-acting with the roof hook, FIG. 3 shows a perspective view of a solar panel arranged on a tiled roof by means of the device according to FIG. 2, FIG. 4 is a perspective view of a plurality of solar panels arranged on a tiled roof by means of a plurality of the devices according to FIG. 2, and FIG. 5 shows a side view of an alternative base element for use in a device according to the invention.

FIG. 1a shows a side view of a roof hook 1 of a device according to the invention. Roof hook 1 is adapted particularly for coupling to a tile batten of a roof (not shown), wherein roof hook 1 in fact serves as base structure for a mounting rail (see FIG. 1b) to which a solar panel or other object can be fixed. Roof hook 1 comprises for this purpose a hook-shaped member 2 provided with a profiled inner side 3, wherein hook-shaped member 2 is adapted for co-action with a tile batten (not shown). An outer end of roof hook 1 remote from hook-shaped member 2 is provided with coupling means 4 adapted for co-action with mating means forming part of a mounting rail (see FIG. 1b). Coupling means 4 herein comprise one slightly resilient tongue 5 to enable a snap connection with the mating means to be realized. Coupling means 5 further comprise a protruding coupling finger 6, and an intermediate locking element 7 for realizing the coupling. Roof hook 1 is manufactured in this exemplary embodiment from an extrusion profile made of aluminium which is particularly characterized by a relatively great strength.

FIG. 1b shows a side view of a mounting rail 8 of a device according to one exemplary embodiment of the present disclosure. Mounting rail 8 is adapted to be partially enclosed by the resilient tongue 5, wherein a tooth 5a disposed at a distal part of tongue 5 can be received in a first receiving space 9 arranged in mounting rail 8. Mounting rail 8 has a wall 8a that has a wall first side 8b that forms a hook attachment section 8c and a wall second side 8d that forms a panel attachment section 8e and is also provided with a generally C-shaped second receiving space 10 for accommodating at least a part of the protruding coupling finger 6 including a notch 6a. Mounting rail 8 is further provided with a third receiving space 11 formed by a groove for the purpose of receiving at least a part of locking element 7. A side of mounting rail 8 remote from the second receiving space 10 and third receiving space 11 is provided with a fourth receiving space 11A for receiving a part of the object, or, in any case, at least a part of mechanical fixing means connected to the object, such as, for instance, optionally by self-tapping screws 12b. By first arranging coupling finger 6 in the second receiving space 10, and subsequently pivoting the slightly resilient tongue 5 in the direction of mounting rail 8, a reliable snap connection can be realized between the two components 1, 8. The snap connection can further be broken either by slightly deforming the tongue 5, which will generally be difficult, or by moving or sliding mounting rail 8 in an axial direction relative to the roof hook 1. The length of mounting rail 8 will generally be greater than 1 meter, wherein mounting rail 8 will, in general, be manufactured from an extrusion profile made of aluminum.

FIG. 2 shows a perspective view of roof hook 1 according to FIG. 1a and mounting rail 8 according to FIG. 1b co-acting with roof hook 1. Clearly shown in this FIG. 2 is that coupling finger 6 is received in the second receiving space 10 of mounting rail 8, and that locking element 7 is received in the third receiving space 11 of mounting rail 8. Tongue 5 herein encloses a part of the underside of mounting rail 8, wherein an outer end of tongue 5 is received in a first receiving space 9 of mounting rail 8, whereby roof hook 1 and mounting rail 8 are fixed two-dimensionally relative to each other. The assembly or support frame of roof hook 1 and the mounting rail 8 coupled to roof hook 1 forms an exemplary embodiment of a device 12 according to the invention.

FIG. 3 shows a perspective view of a solar panel 14 arranged on a tiled roof 13 by means of device 12 according to FIG. 2. The tiled roof 13 is herein provided with a plurality of tile battens 15 to support a plurality of roof tiles 16. Since no additional mechanical fixing elements are required for mounting the complete device 12 on tiled roof 13, disassembly can be realized relatively quickly and at relatively low cost.

FIG. 4 shows a perspective view of a plurality of solar panels 18 arranged on a tiled roof 17 by means of a plurality of the devices 12 of FIG. 2. Mounting rails 8 of devices 12 either lie mutually in line or have a substantially parallel orientation. About four roof hooks 1 will generally be positioned per square meter of roof surface. As shown in FIG. 4, it is possible in this way to fix a plurality of solar panels 18 in a relatively simple and structured manner to a tiled roof 17 which may or may not be pitched. Fixing of device 12 on tiled roof 17 takes place in accordance with the method shown in FIG. 4.

FIG. 5 shows a side view of an alternative base element 19 for use in a device according to the invention. Base element 19 is in fact formed by a roof hook which is structurally very similar to roof hook 1 shown in FIG. 1*a*. Base element 19 comprises a hook-shaped member 20, which hook-shaped member 20 comprises two hook parts 21*a*, 21*b* which are mutually connected by means of a screw connection 22. It is possible in this manner to be able to adapt the width B between the two hook parts 21*a*, 21*b* relatively easily to the width of a tile batten situated therebetween (not shown). So as to be able to optimize the coupling between hook-shaped member 20 and the tile batten, both hook parts 21*a*, 21*b* are provided with a sawtooth profile 23*a*, 23*b*. An outer end of hook-shaped member 20 remote from the base element is provided with coupling means 24 to enable clicking of base element 19 fixedly to a top structure (not shown). Coupling means 24 are here formed by two coupling members 25*a*, 25*b* in mirror image design.

It will be apparent that the invention is not limited to the exemplary embodiments shown and described here, but that within the scope of the appended claims numerous variations are possible which will be self-evident to the skilled person in this field.

The invention claimed is:

1. A hook configured for installing a mounting rail onto a roof, the mounting rail adapted to be coupled to at least one of a solar panel or a solar boiler, the hook comprising:
   a first coupling configured to couple, by a snap fitting, a mounting rail to the hook, the first coupling comprising a coupling finger, a locking element, and a resilient tongue; and
   a second coupling configured to engage to a base element of a roof;
   wherein the first coupling is configured to allow the snap fitting of the mounting rail onto the hook in a direction transverse to the roof
   and the resilient tongue terminates in a tooth.

2. The hook of claim 1, wherein the coupling finger has a notch.

3. The hook of claim 1, wherein the first coupling is adapted to be connected to the mounting rail, the mounting rail comprising a hook attachment section adapted to be connected to the hook, the hook attachment section comprising:
   a coupling finger notch receiving portion comprising a wall having a concave receiving space adapted to receive and retain coupling finger notch;
   a tongue receiving portion comprising a wall having a channel adapted to receive and retain the tooth of the tongue; and
   a locking element receiving portion comprising a concave receiving space adapted to receive the locking element.

4. The hook of claim 3, wherein the first coupling is adapted to be connected to a mounting rail by a snap connection, the snap connection being formed by arranging the coupling finger to be received in the receiving portion and by pivoting the resilient tongue in the direction of the mounting rail such that the tongue is placed within the channel of the tongue receiving portion.

5. The hook of claim 1, wherein the second coupling comprises a first section including a first portion having a plurality of teeth forming a sawtooth profile, a second portion generally parallel to the first section, and a third portion connecting the first and second portions such that the first section forms a generally U-shaped hook.

6. A hook configured for installing a mounting rail onto a roof, the mounting rail adapted to be coupled to at least one of a solar panel or a solar boiler, the hook comprising:
   a first coupling configured to couple, by a snap fitting, a mounting rail to the hook, the first coupling comprising a coupling finger, a locking element, and a resilient tongue; and
   a second coupling configured to engage to a base element of a roof;
   wherein the first coupling is configured to allow the snap fitting of the mounting rail onto the hook in a direction transverse to the roof;
   and wherein the coupling finger has a notch.

* * * * *